United States Patent [19]

Muehllehner et al.

[11] Patent Number: 5,331,553
[45] Date of Patent: Jul. 19, 1994

[54] THREE DIMENSIONAL IMAGE RECONSTRUCTION FOR A POSITRON EMISSION TOMOGRAPH

[75] Inventors: Gerd Muehllehner, Wayne, Pa.; Robert M. Lewitt, Stratford, N.J.

[73] Assignee: UGM Medical Systems, Inc., Philadelphia, Pa.

[21] Appl. No.: 869,523

[22] Filed: Apr. 15, 1992

[51] Int. Cl.$^5$ .................... G06F 15/72; G01T 1/172
[52] U.S. Cl. .................... 364/413.24; 364/413.13; 378/24; 378/25; 250/363.02; 250/363.04; 250/369
[58] Field of Search .................... 364/413.13, 413.24, 364/413.14, 413.15, 413.16, 413.19, 413.22; 378/24, 25, 26, 27; 395/119, 124; 250/363.03, 363.04, 363.07, 363.02, 363.1, 369

[56] References Cited

U.S. PATENT DOCUMENTS

| | | | |
|---|---|---|---|
| 3,955,088 | 5/1976 | Muehllehner et al. | 250/363 S |
| 4,057,727 | 11/1977 | Muehllehner et al. | 250/363 S |
| 4,415,807 | 11/1983 | Friauf et al. | 250/363 S |
| 4,473,749 | 9/1984 | Derenzo et al. | 250/363 S |
| 4,531,058 | 7/1985 | Burnham et al. | 250/363 S |
| 4,674,046 | 5/1987 | Ozeki et al. | 364/414 |
| 4,737,921 | 4/1988 | Goldwasser et al. | 364/518 |
| 4,755,680 | 7/1988 | Logan | 250/363 |
| 4,761,819 | 8/1988 | Denison et al. | 382/54 |
| 4,823,016 | 4/1989 | Yamashita et al. | 250/363.03 |
| 4,873,632 | 10/1989 | Logan et al. | 369/413.13 |
| 4,879,652 | 11/1989 | Nowak | 364/413.18 |
| 4,931,968 | 6/1990 | Hirose | 364/571.02 |
| 4,980,552 | 12/1990 | Cho et al. | 250/363.03 |
| 5,008,822 | 4/1991 | Brunnett et al. | 364/413.21 |
| 5,023,449 | 6/1991 | Holenka et al. | 250/252.1 |
| 5,185,142 | 2/1993 | Larson et al. | 424/1.1 |

OTHER PUBLICATIONS

Lewitt, et al.: "3D Image Reconstruction for PET by multi-slice rebinning & axial filtering", IEEE Nuc. Sci. Symposium, vol. 3, pp. 2054–2061. (Feb. 1992).
Karp, et al.: "Effect of Increased Axial-Field of View on the Performance of a Volume PET Scanner", IEEE Trans., 1993, vol. 12, No. 2 (Manuscript received Dec. 10, 1991). (Jun.), p. 299–306.
G. Muehllehner et al., Design and Performance of a New Positron Tomograph IEEE Trans. Nucl. Sci. vol. 35, No. 1, pp. 670–674 (1988).
J. S. Karp et al. "Continuous-Slice PENN-PET: A Positron Tomograph with Volume Imagining Capability" J. Nucl. Med., vol. 31, No. 5, pp. 616–627 (1990).
M. E. Daube-Witherspoon et al., Treatment of Axial Data in Three-Dimensional PET, J. Nucl. Med., vol. 28, pp. 1717–1724 (1987).
G. Muehllehner et al. A Positron Camera Using Position-Sensitive Detectors: PENN-PET J. Nucl. Med., vol. 27, No. 1, pp. 90–98 (1986).
M. Daube-Witherspoon et al, An Iterative Image Space Reconstruction Algorithm Suitable for Volume ECT IEEE Trans. On Medical Imaging vol. M1-5, No. 2, pp. 61–66 Jun., 1986.
J. Karp et al. Event Localizaton In A Continous Scintillation Detector Using Digital Processing IEEE. NS-33, pp. 530–535 (1986).
J. Karp et al., A Position-Sensitive Detector For Use in Positron Emission Tomography, Elsevier Science Publishers B.V., Nucl. Inst. and Methods In Physics Research, pp. 891–897 (1988).
D. Mankoff et al., Multi-Frame Data Acquisition for PET Camera Using On-Line Microprocessor-Based System, IEEE Trans. On Medical Imaging vol. 33 No. 1, pp. 443–445 Feb. 1986.

Primary Examiner—Joseph Thomas
Attorney, Agent, or Firm—Reed Smith Shaw & McClay

[57] ABSTRACT

Images are reconstructed using multi-slice rebinning of raw data to create a stack of two-dimensional data sets. A three-dimensional image is reconstructed slice-by-slice from the data sets and the rebinned data is axially filtered to reduce blurring resulting from the rebinning, the filtering being performed either before or after reconstruction of the three-dimensional image.

17 Claims, 6 Drawing Sheets

THREE DIMENSIONAL IMAGE RECONSTRUCTION FOR A POSITRON EMISSION TOMOGRAPH

BACKGROUND OF THE INVENTION

This invention relates to a method for three dimensional image reconstruction from data acquired in a positron emission tomograph ("PET"), typically for medical imaging purposes.

In positron emission tomography ("PET"), the location of a positron source within the tissues of a living subject is determined by detection of the oppositely directed gamma rays, known as "lines of response" or "coincidence lines", which result from so-called "annihilation events", electron collisions with emitted positrons. By simultaneously detecting the location of the two gamma rays, information may be derived concerning the location of the positron source. The aggregate of such information can be used to construct an image.

Energy carried by the gamma rays is typically sensed by detectors disposed in an array about the subject under study. The detectors convert the energy carried by the gamma rays, to record the position of the events which gave rise to the rays. Electrical signals representative of the detected gamma rays may be processed by a system which typically includes a programmed digital computer capable of processing the position data to form an image of the structure, organ or patient under examination.

Since the gamma radiation resulting from positron annihilation travels approximately collinearly and in opposite directions, sensing coincidence in time of rays extending in opposite directions establishes the occurrence of an event, and, as will be described, the location of the event as well.

Numerous positron emission tomography scanners have been described in the prior art.

Most commercially available PET scanners have used detectors comprised of many discrete scintillation crystals, optically coupled to individual photomultiplier tubes disposed around the field of view containing the image volume. Some prior art attempts to enhance image resolution in PET have involved the use of larger numbers of detectors, or alternatively, a reduced although still numerous number of detectors mounted in a movable array.

G. Muehllehner et al. have heretofore proposed and constructed a positron tomograph capable of achieving high spatial resolution while avoiding the complexity of individual photomultipliers ("PMTs") coupled to individual small detectors. G. Muehllehner, J. S. Karp, D. A. Mankoff et al.: Design and Performance of a New Positron Tomograph. IEEE Trans. Nucl. Sci., Vol. 35, No. 1, pp. 670–674 (1988). Such devices feature and are capable of exploiting large area modular position-sensitive detector crystals, coupled to an array of PMTs. In one such type of device, produced and sold by UGM Medical Systems, Inc., of Philadelphia, Pa., as the "PENN-PET" scanner, a hexagonally arranged array of six large area position-sensitive sodium iodide (NaI(T1)) crystals is used, each crystal being coupled to an array of thirty PMTs arranged in three rows of ten. J. S. Karp., G. Muehllehner, D. A. Mankoff et al.: Continuous Slice PENN-PET: A Positron Tomograph With Volume Imaging Capability. J. Nucl. Med., Vol. 31, No. 5, pp. 616–627 (1990).

Detectors of the above type have good spatial resolution in both the transverse and the axial directions, and the axial field of view of the detectors has been increasing steadily. Such detectors can identify a very large number of different coincidence lines through the three-dimensional space between opposing detector modules.

In devices such as the above-mentioned PENN-PET scanner, sensed coincidence lines are not constrained, as by septa or other means, to planes perpendicular to the longitudinal (z) axis of the field of view. Indeed, in such scanners the coincidence lines are oblique for most detected photon pairs, and reconstruction algorithms must therefore be devised to handle the fully-three dimensional ("3D") raw data from the detector system.

Two different approaches have been used to reconstruct from raw data. These may be called for convenience the "single-slice rebinning" approach and the "fully-3D" approach. The single-slice rebinning approach assigns each oblique coincidence line to a particular two dimensional ("2D") sinogram associated with a transverse slice of the volume. The reconstruction of the resulting stack of sinograms proceeds in a slice-by-slice fashion using conventional 2D algorithms known to those skilled in the art. This approach involves certain geometrical approximations (See: M. E. Daube-Witherspoon and G. Muehllehner, Treatment of Axial Data In Three-Dimensional PET, J. Nucl. Med., Vol. 28, pp. 1717–1724 (1987)), but it requires the least possible amount of computation and data storage capability. Fully-3D reconstruction algorithms, both iterative and non-iterative, process oblique coincidence lines without making geometrical approximations, but image reconstruction using either kind of fully-3D algorithm requires a considerable amount of computation.

SUMMARY OF THE INVENTION

The present invention seeks to achieve from 3D coincidence data image reconstruction approaching the accuracy of the fully-3D approach, with the simplicity and modest amount of computation of the single-slice rebinning approach. In general, the present invention involves what may be called "multi-slice rebinning" of the coincidence lines into a stack of 2D sinograms, and what may be called an "axial filtering" operation which can be done either before or after the operation of slice-by-slice reconstruction.

In accordance with the invention, multiple sinograms are incremented for each oblique coincidence line. In this regard, for each oblique coincidence line, the set of transverse slices it intersects is identified and each of the sinograms associated with these slices is incremented. The increment is applied to the same 2D location in each of the intersected sinograms. The operation of multi-slice rebinning may be viewed as a backprojection of the data in the axial direction, which is then followed by the axial filtering operation to overcome blurring resulting from the rebinning.

The operation of multi-slice rebinning can be performed in real time during data collection, thereby reducing memory and computational requirements relative to previously described methods.

BRIEF DESCRIPTION OF THE DRAWINGS

There are seen in the drawings aspects of the invention which are presently preferred (and which constitute the best mode contemplated for carrying the invention into effect), but it should be understood that the invention is not limited to the precise arrangements and instrumentalities shown.

DETAILED DESCRIPTION

Figure 1:
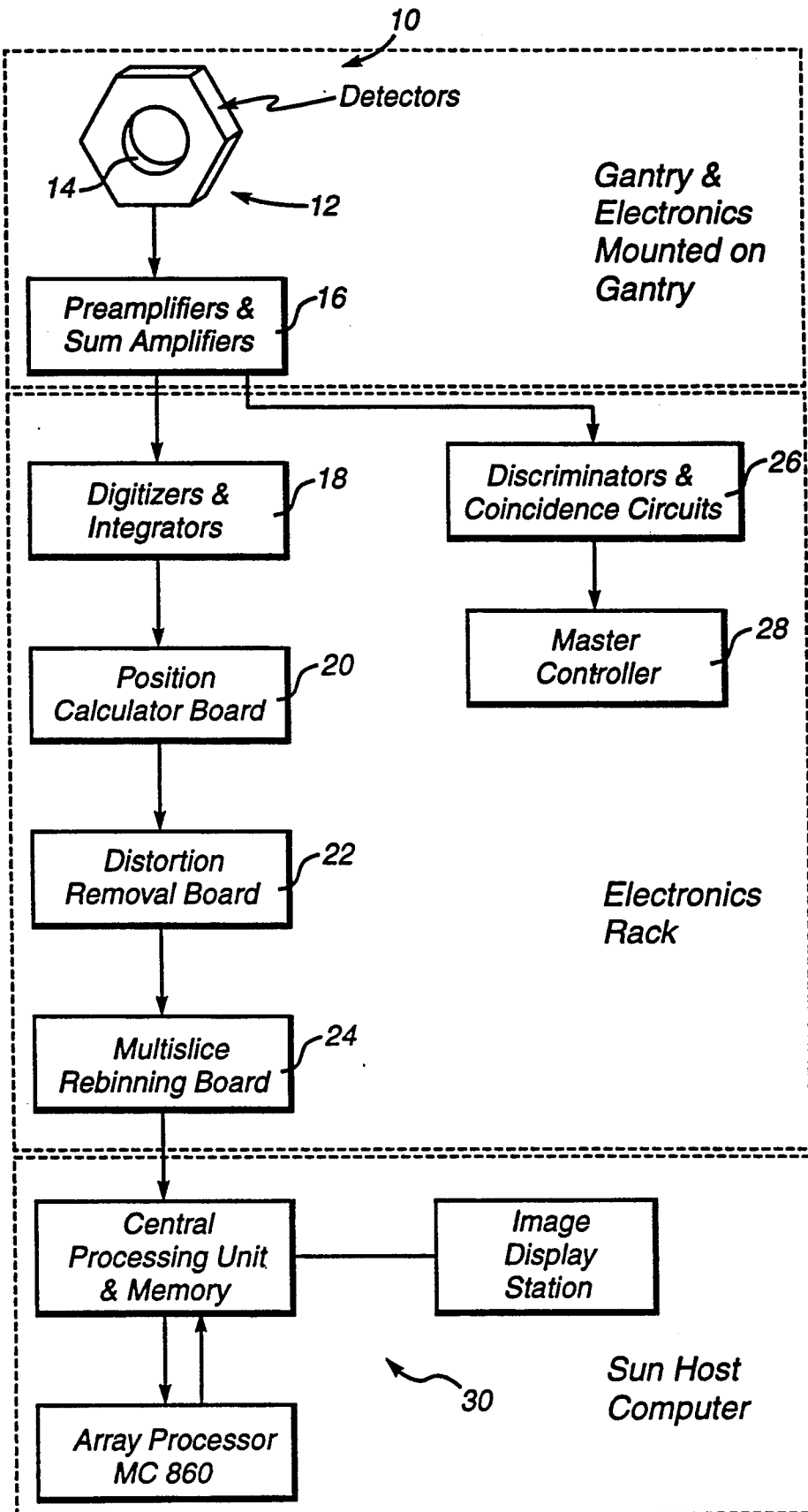
FIG. 1 is a block diagram of an imaging system using the image reconstruction techniques of the present invention.

Referring now to the drawings in detail, wherein like reference numerals indicate like elements, there is seen in FIG. 1 a simplified block diagram depicting data acquisition and processing in an imaging system using the present invention.

The imaging system, designated generally by the reference numeral 10, includes a gantry, designated generally by the reference numeral 12, which houses a hexagonal array of detectors described in somewhat greater detail below. The gantry 12 has a central opening 14 in which a subject to be imaged may be positioned. Associated with the gantry 12 may be electronic circuitry 16, typically consisting of preamplifiers and summing amplifiers, which receive and initially condition raw analog coincidence data provided by the detectors. The output of the circuitry 16 associated with the gantry 12 is supplied to digitizers and integrators 18 of types familiar to those skilled in the art, and the resulting signal is in turn applied to a board 20, whose circuitry serves to calculate the position of the positron source and reorganize the data into desired data sets, such as sinograms. A board 22 receives the output of the position calculation board 20, and serves to remove distortion in accordance with known algorithms. The resulting data is applied to a board 24 at which there is performed the multislice rebinning operation described in detail below. The preamplifiers and summing amplifiers 16 also supply discriminators and coincidence circuits 26, which select those gamma-rays found in coincidence and which are therefore attributed to annihilation events, and a master controller 28, which controls the processing of the coincidence events.

In a presently preferred form of the invention, the digitizers and integrators 18, position calculator board 20, distortion removal board 22, multislice rebinning board 24, discriminators and coincidence circuits 26 and master controller 28 are all physically associated with an electronics rack, not shown.

Associated with a host computer, depicted generally by the reference numeral 30, are a central processing unit (CPU) and memory. An array processor and image display station are associated with the host computer 30.

Figure 2:
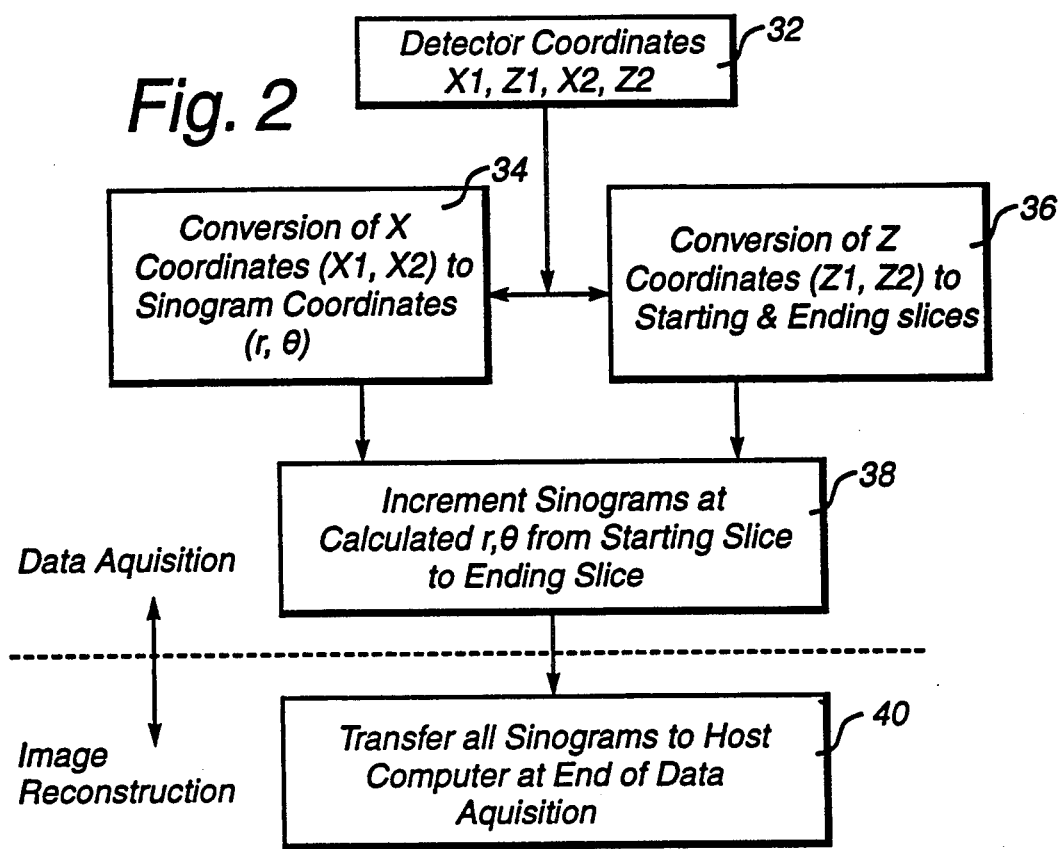
FIG. 2 is a block diagram illustrating the sequences of steps involved in data acquisition and image reconstruction in accordance with the invention.

FIG. 2 provides a flow diagram for data acquisition and image reconstruction in accordance with the invention. The steps and operations depicted in FIG. 2 are described in greater detail below.

Referring now to FIG. 2, in the data acquisition aspect of the process, the coordinates $x_1,z_1$ $x_2,z_2$ for the ends of a ray are sensed, at 32. The x coordinates ($x_1,x_2$) are then converted, at 34, to other convenient data sets, such as, for example, sinogram coordinates (r, $\Theta$). The z coordinates ($z_1,z_2$) representing the end points are correlated and converted, at 36, to starting and ending slices traversed by the ray. Next, the data sets (here, sinograms) are incremented, at 38, using the multi-slice rebinning technique described elsewhere in this specification, for the slices traversed by the ray.

Figure 2A:
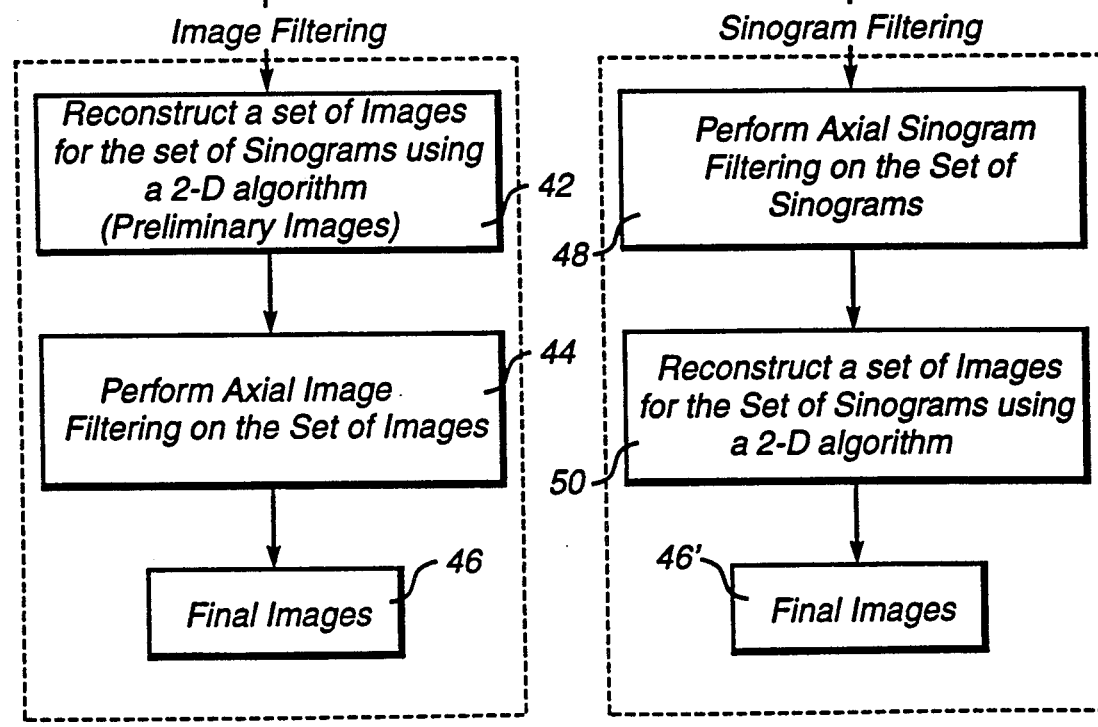
FIG. 2a is a partial block diagram, illustrating an alternative sequence of steps for image reconstruction in accordance with the invention.

After completion of data acquisition as above, image reconstruction is accomplished in the preferred embodiment of the invention in the following manner: the sinograms are transferred, at 40, to the host computer 30. Reconstruction can then proceed in one of two alternatives. In one alternative, depicted in FIG. 2 and referred to for convenience as "image filtering", preliminary images are constructed from the set of sinograms, at 42, and axial filtering (44) is thereafter performed to yield a final image, at 46. In the other alternative approach to reconstruction, depicted in FIG. 2a, axial filtering is performed on the set of sinograms, at 48, prior to reconstruction of a set of images. This approach may be referred to as "sinogram filtering". A set of images may then be reconstructed, as at 50, to yield final image 46'.

A common method for compressing coincidence data in imaging is to reorganize, or "rebin", the data into a stack of arrays of projection data, or sinograms, with projection data matrices corresponding to parallel slices through the object.

Figure 3:
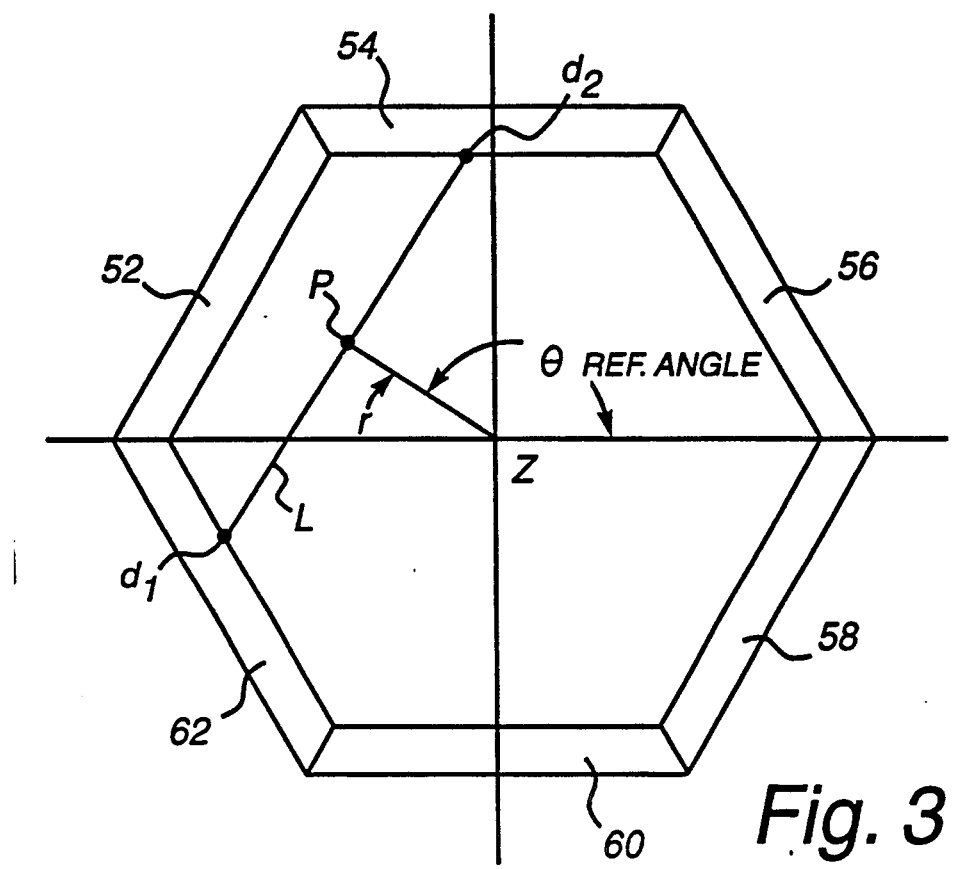
FIG. 3 is a schematic diagram illustrating the transverse geometry of a known technique for reorganizing ("rebinning") raw coincidence data in PET.
Figure 4:
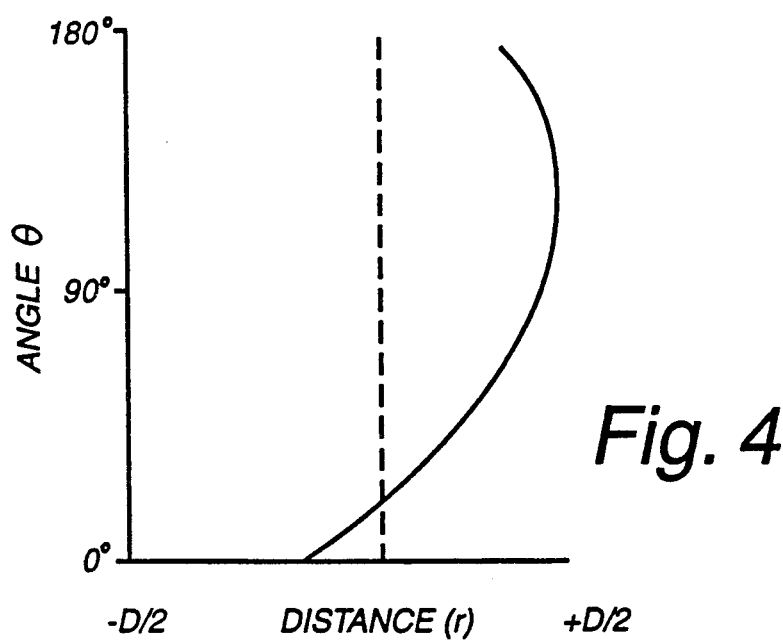
FIG. 4 is an illustration of a sinogram for a point source located as depicted in FIG. 3.

FIGS. 3 and 4 illustrate by way of background known techniques for creating sinograms depicting point sources in two-dimensional space. A point source "P" in FIG. 3 is located within the field of view encompassed by the hexagonal array of detectors 52–62. The coincidence line "L", which for the purpose of this illustration lies in a plane perpendicular to the longitudinal axis (z) of the field of view, and therefore within a single "slice" of the volume under study, encounters detectors 54 and 62. Computing from the positions of the end points $d_1$, $d_2$ of the coincidence line "L" relative to the detectors 62 and 54, a coincidence line through the point source "P" may be determined. The radius "r" of the point P from the center (the z axis) of the field of view may likewise be determined. Also, a reference angle $\Theta$ may be determined for P relative to a horizontal or other datum line. Plotting the reference angle $\Theta$ relative to the distance from the center (r), as shown in FIG. 4, yields a sinogram as depicted in FIG. 4, a function of r and $\Theta$ (the conventional indices for two-dimensional sinograms). Thus, for a reconstructed slice at index I(z) on the longitudinal axis(z) within the field of view of the scanner there is a corresponding sinogram, which may be denoted "sino $(r,\Theta,I(z))$" that may be input to the reconstruction algorithm.

Figure 5:
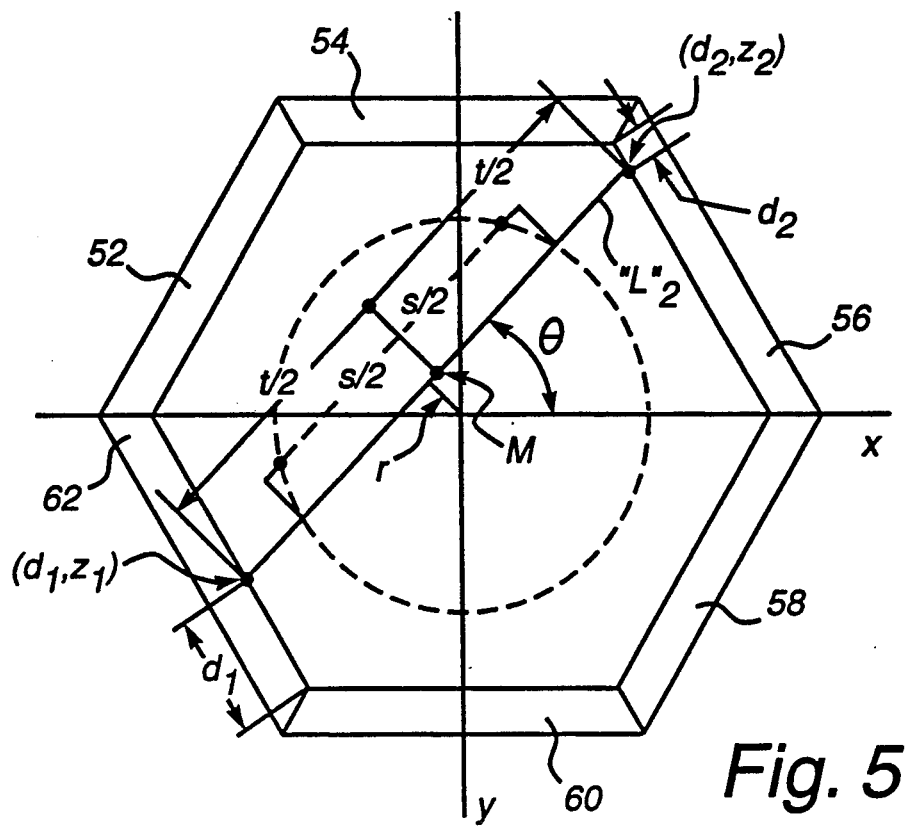
FIG. 5 is a schematic diagram illustrating the transverse geometry of the new technique for reorganizing raw coincidence data in PET.
Figure 6:
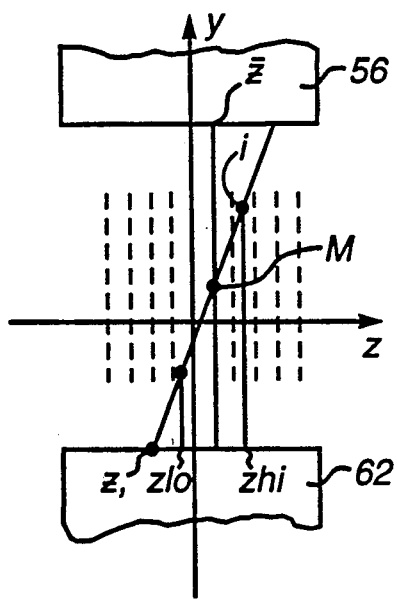
FIG. 6 is a schematic diagram illustrating the axial geometry of the technique shown in FIG. 5.

Referring now to FIGS. 5 and 6, these show, respectively, the transverse and axial geometry for rebinning of data for oblique coincidence lines which traverse more than one transverse slice. The rebinning procedure now to be described may be referred to conveniently as "multi-slice rebinning".

Referring now to FIG. 5, $(d_1,z_1)$ and $(d_2,z_2)$ are the detector coordinates resulting from coincident detection of a collinear pair of gamma rays. The coincidence line "$L_2$" from $(d_1,z_1)$ to $(d_2,z_2)$ is projected onto the transverse (x,y) plane $z=0$, where the parameters $(r,\Theta)$ of the projected line and of the point "M" half-way along the projected line are determined. For the half-way point M on the projected line, one can determine the z-coordinate on line $L_2$ that projects to this point. Referring to FIG. 6, this z-coordinate is denoted by $\bar{z}$, and it will be seen that $\bar{z}=(z_1+z_2)/2$. $I(\bar{z})$ denotes the index of the slice containing $\bar{z}$, and the increment for a location in the sinogram may be denoted by incr. Then for each coincidence line one can determine r, $\Theta$ and $\bar{z}$ as described above and add incr to sino$(r,\Theta,I(\bar{z}))$.

In the above-described steps, the increment is applied to only a single sinogram for each coincidence line. In such a case, which may be referred to as "single slice rebinning", the increment (incr) would be set at 1. In multi-slice rebinning, however, in accordance with the present invention, the following additional steps are taken: instead of considering only the point "M" half-way along the projected line $L_2$, one determines as well the z coordinates at which the coincidence line $L_2$ enters and leaves the volume to be imaged. Referring again to FIG. 6, these z-coordinates on the coincidence line $L_2$ are designated "zlo" and "zhi". The distance across the hexagon between the two detectors, i.e., the length of the line from detector coordinates $(d_1,0)$ to $(d_2,0)$, is denoted by t. It will be seen that $$zlo = \bar{z} - (s/2)|z_2 - z_1|/t,$$

and $$zhi = \bar{z} + (s/2)|z_2 - z_1|/t.$$

where "s" (seen in FIGS. 5 and 6) is set equal to the diameter of the transverse field of view.

The sinograms sino$(r,\Theta,i)$ for each slice i between I(zlo) and I(zhi) are incremented. For a given coincidence line, the same increment is given to all slices in this range, but the increment is different for different coincidence lines, depending on the number of sinograms to be incremented. In this regard, the increment is made inversely proportional to the number of sinograms incremented, i.e., $$incr = \frac{maxincr}{I(zhi) - I(zlo) + 1}$$

In the presently preferred embodiment of the invention, sinograms and increments are represented by integers, and the maximum increment is set at 64. After all coincidence lines have been rebinned, a normalization factor is applied so that the total number of counts in the stack of sinograms is equal to the number of events rebinned.

Figure 7:
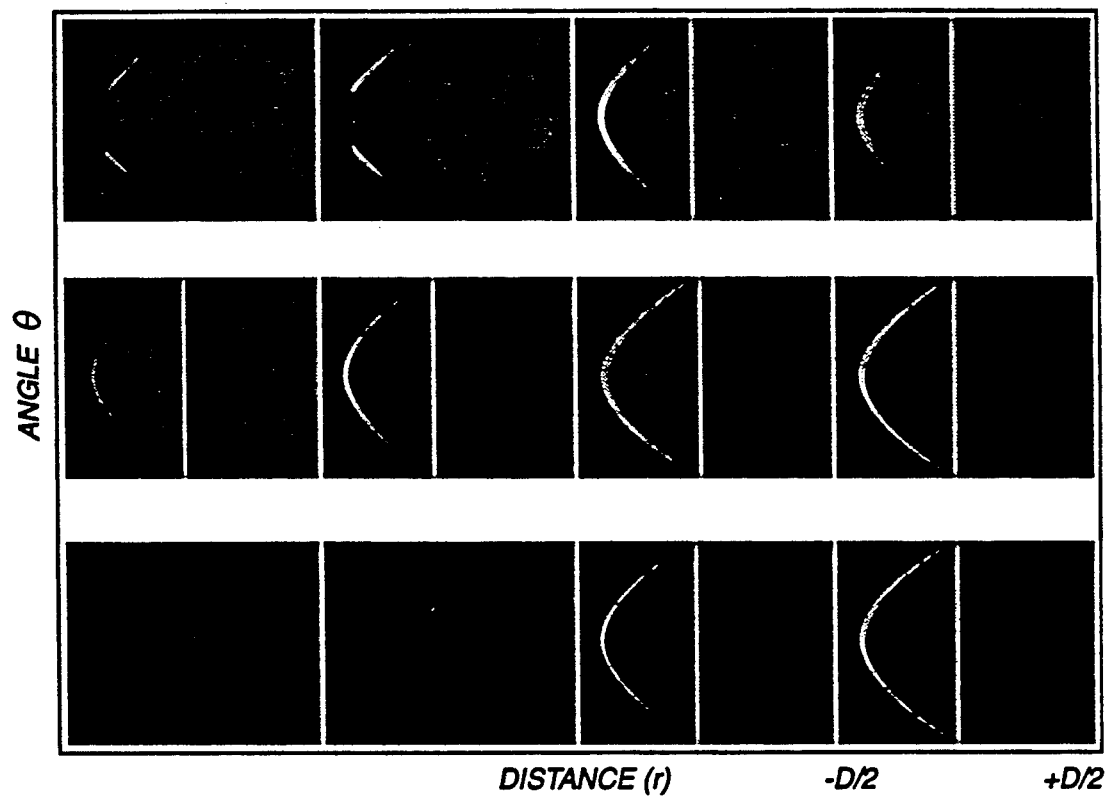
FIG. 7 depicts sinograms demonstrating the properties of various techniques for reorganizing raw data, specifically the known technique involving single-slice rebinning, and the present invention involving multi-slice rebinning.

The properties of the two methods of rebinning, single-slice and multi-slice, are demonstrated in FIG. 7. This Figure shows the sinograms resulting from the rebinning of simulated coincidence data (with slice thickness 2 mm) for an activity distribution consisting of two small (6 mm diameter) spherical sources, one centered at (0,0,0) and the other at (100,0,0) mm.

The top row of sinogram frames shows a range of slices in the stack of sinograms resulting from single-slice rebinning, where the slice containing the centers of both sources (i.e., the slice $z=0$) is at the right-hand end of the row. It is apparent from the sinograms that slice-by-slice reconstruction will produce an accurate image of the source at (0,0,0), but will produce a distorted image of the source at (100,0,0). For the off-center source, the sinograms are non-uniform in angle (the vertical direction in FIG. 7), because the counts for some angles have been assigned to slices that do not contain the source. Reconstruction from non-uniform sinograms such as these will lead to distorted images. For a typical point source, the amount of the blurring in the x, y, and z directions depends strongly on the position of the source.

Referring again to FIG. 7, the middle row of sinogram frames in FIG. 6 shows the corresponding slices resulting from multi-slice rebinning. Compared to single-slice rebinning (the above-discussed top row) the sinograms are much more uniform in angle, but it will be seen that there is strong blurring in the z direction which, as will be explained, may be corrected by axial filtering in accordance with the invention. The bottom row of sinogram frames in FIG. 7 illustrates the effect of multi-slice rebinning and axial filtering, in accordance with this invention.

Referring again to FIG. 7, it will be noticed that for multi-slice rebinning without filtering, the reconstructed image of a point source is reasonably localized in the x and y directions, but is spread out in the z direction. The image is localized in x and y because the rebinned sinograms for each z are reasonably uniform over the full range of angles $\Theta$. The spread in the z direction is largest for a point source in the central slice of the axial field of view because the range of slopes of detected coincidence lines is largest for such a point. The extent of the spread in the z direction decreases steadily as the point is moved in the z direction toward the edge of the axial field of view, until the spread becomes zero at the edge of the axial field of view, where no oblique lines are detected. This relationship is evident in FIG. 8, which graphically depicts spread functions (derived as described below) for seven points on the z axis in an exemplary scanner. The points are distributed from $z=0$ (axial position 64 in FIG. 8) to $z=60$ mm (axial position 124 in FIG. 8). Axial position 64 represents the center in the axial (z) direction of the field of view.

That the extent of the blurring in the z direction is strongly dependent on the z coordinate of the point source prevents use of the most efficient deconvolution methods for deblurring in the z direction of sinograms or reconstructed images. The problem can be overcome, however, using more general methods. A more fundamental problem is the dependence of the blurring on x' and y', which arises because a line at a certain $r,\Theta$, and slope (where slope$=(z_2-z_1)/t$) through a point in a plane $z=z'$ far from the z axis does not increment the same set of slices as does a line having the same $r,\Theta$ and slope through $(0,0,z')$, i.e., through another point that is in the same plane but is on the z axis. This problem can be overcome by general deblurring methods operating in image space, as described below. It is, however, a fundamental problem for methods that operate in sinogram space because, in the process of rebinning, coincidence lines through many different transverse points (x',y') are accumulated in the same location (r,Θ) in the sinogram. For this reason, the process for correction of the sinogram has to assume that the blurring function is the same for the different points (x',y').

As has been noted, rebinning of coincidence data produces, in effect, a stack of sinograms, each of which may be reconstructed independently by a 2D reconstruction algorithm to produce a stack of slice images. In the aggregate, these may be called for convenience a preliminary image. As indicated above, multi-slice rebinning of oblique coincidence lines leads to blurring in the z direction in the sinograms, and consequently in the 3D reconstructed volume.

In accordance with the invention, axial filtering, presently preferred techniques for which will now be described, addresses and eliminates unacceptable blurring in the reconstructed volume.

(a) Image Filtering

The term "object space" and coordinates (x',y',z') may be used to refer to the 3D space containing an unknown activity distribution, denoted by f'. The term "image space" and coordinates (x,y,z) may be used to refer to the 3D space containing the reconstructed estimate of the activity distribution, denoted by f, and the preliminary image, denoted by g. It may be assumed that the detection process is linear, so that there is a linear relationship between the coincidence data and the function f'. Since multi-slice rebinning and slice-by-slice reconstruction are linear operations, the preliminary image g can be expressed in terms of the activity distribution f' by $$g(x,y,z) = \int\int\int f'(x',y',z')h(x,y,z,x',y',z')dx'dy'dz'$$

where h is the point-response function. More specifically, h(x,y,z,x',y',z') is the reconstructed value at (x,y,z) in the preliminary image due to an isolated point source at (x',y',z'). The discrete form of the above equation can be expressed as $$g = Hf'$$

where g and f' are N×1 vectors and H is an N×N matrix.

In the case of three dimensional blurring, N is the total number of elements in the volume image. However, in the illustrated case of significant blurring only in the z direction, N is the number of slices, and there is a separate system of equations for each point (x,y) in the transverse plane. Since the computational requirements for the filtering operation are much less than the case of 3D blurring, and since, as discussed above, the blurring due to multi-slice rebinning is mostly in the z direction, it is practicable to concentrate on the case of blurring only in the z direction.

Each element h of the matrix H can be found for a particular scanner geometry by simulating the multi-slice rebinning procedure for a point source at the corresponding position on a grid in object space. It will be apparent that since g and H are known, there is a system of linear equations for each column of the image volume (each x and y) from which we want to obtain f (an estimate of the activity distribution f') whose elements correspond to the N slices in the column.

Methods for solving the systems of linear equations that arise in the formulation of deblurring problems are discussed in many books (e.g., P. A. Jansson, Deconvolution With Applications in Spectroscopy. Orlando, Fla.: Academic Press, 1984; S. Twomey, Introduction to the Mathematics of Inversion in Remote Sensing and Indirect Measurements. Amsterdam: Elsevier, 1977.) and survey papers (e.g., B. R. Frieden, "Image Enhancement and Restoration," Chapter 5 in. Picture Processing and Digital Filtering, T. S. Huang, Ed. Berlin: Springer-Verlag, 1979, pp. 177–248). The classical linear methods for these problems produce a solution vector f which is a compromise between satisfying the equations and satisfying some smoothness conditions. These linear methods have the advantage that the relevant matrix inverse may be precomputed and stored, and then used as a filter for different sets of data. Nonlinear methods for deblurring are iterative in nature, and generally require more computation than linear methods, but they have the advantage that positivity constraints may be imposed on the elements of the solution vector f.

In the practice of this invention, it is preferred that an iterative deblurring procedure which is known as Gold's ratio method, P. A. Jansson, supra, or Chahine's relaxation method, W. P. Chu, "Convergence of Chahine's Nonlinear Relaxation Inversion Method Used For Limb Viewing Remote Sensing," Appl. Opt., vol 24, pp. 445–447, be used. The estimate of f resulting from the kth iteration of this procedure is denoted by $f^{(k)}$, and the procedure is initialized by setting $f^{(0)} = g$. The (k+1)'th iteration of the algorithm (k≥0) is given by $$f_i^{(k+1)} = f_i^{(k)} \left[ \frac{g_i}{(Hf^{(k)})_i} \right], i = 1, \ldots, N$$

In practice, the algorithm may be run for only a few iterations, stopping well short of numerical convergence. By changing the number of iterations, different compromises between deblurring of the preliminary image and amplification of the noise can be achieved.

Since no elements of the system matrix H are negative, the multiplicative nature of the correction ensures that no elements of $f^{(k+1)}$ can be negative, if the elements of the data vector g are also non-negative. In order to obtain this desirable property, one can use as the vector g the preliminary image with any negative values set to zero.

(b) Sinogram Filtering

It has been explained that a point source at (x', y',z') gives a blurring in the z direction of the stack of sinograms that depends strongly on z' and only weakly on x' and y'. If it is assumed that the point-spread function depends only on z', and not on x' and y', then the preliminary image may be expressed in terms of the activity distribution as $$g(x,y,z) = \int f'(x,y,z')h^3(z,z')dz'$$

where $h^3(z,z')$ is the reconstructed value at (x,y,z) in the preliminary image due to a point source at (x,y,z'). The image-space blurring represented by the above equation can be expressed by an equivalent blurring in the stack of sinograms, with coordinates (r,Θ,z). One can convert from image space to sinogram space by taking projections (slice-by-slice) of both sides of the above equation. The sinogram-space result is $$q(r,\Theta,z) = \int p'(r,\Theta,z') h^3(z,z') dz$$

It will be noted that p', p and q are analogous to f', f, and g in the previously described case of image filtering. Discretizing the above equation for the case of N slices yields $$q = H^3 p'$$

where q and p' are $N \times 1$ vectors (for each r and $\Theta$) and $H^3$ is an $N \times N$ matrix. The elements $h^3$ of the matrix $H^3$ can be found for a specific scanner geometry by simulating the multi-slice rebinning procedure for a point source at N different z-positions. Since q and $H^3$ are known, we now have a system of linear equations for each r and $\Theta$ from which we can estimate the unknown $p'(r,\Theta,z)$ for each slice.

One can obtain an estimate of p' using the same iterative method described above for image filtering, that is $$p^{(k+1)} = p^{(k)} \left[ \frac{q}{(H^3 p^{(k)})} \right]$$

where, as before, the equation should be interpreted as producing the i'th component of $p^{(k+1)}$ from the i'th components of the vectors $p^{(k)}$, q, and $(H^3 p_{(k)})$, and the procedure is initialized by setting p(0)=q. Since no elements of the data vector q or the system matrix $H^3$ are negative, the multiplicative nature of the correction ensures that no elements of $p^{(k+1)}$ can be negative. The technique therefore has the desirable property that it automatically generates solutions that are physically meaningful, with no negative counts in the deblurred sinograms.

Specific implementations of axial filtering using sinogram filtering and image filtering will now be described. The numerical values quoted in the description are for the geometry of the UGM PENN-PET scanner (6 detectors, 865 mm effective detector separation, 128 mm effective axial field of view) with typical choices for the rebinning and reconstruction parameters (e.g. 2 mm slice thickness, 6.5 degrees axial acceptance angle, 256 mm diameter reconstruction field of view, 2 mm pixel size).

For sinogram filtering, we generate $h^3(z,z')$ for 33 values of z' spaced 2 mm apart (i.e., the slice thickness) from z'=0 (central transverse slice of scanner to z'=64 mm (slice at end of axial field of view). The number of samples of z depends on the acceptance angle and on the position z' in the axial field of view. For an acceptance angle of 6.5 degrees, the total width of the spread function is 15 slices at z'=0, decreasing to zero width at z'=64 mm. The values of the spread function for each z' are generated by multi-slice rebinning of simulated data, as follows.

A simulated point source is placed at (0,0, z') and 10,000 lines through the point source and in the y-z plane are simulated. The lines are uniformly distributed in the angular range specified (i.e. defined) by the acceptance angle (e.g., ±6.5 degrees around the plane z=z'). Each simulated line that intersects a pair of detectors is rebinned, and the accumulated total for each slice in sinogram space is stored in memory as the spread function for this value of z'. The simulated point is then moved along the z axis through a distance equal to the slice thickness, and the multi-slice rebinning process is repeated to generate the next spread function.

After a table of spread functions has been computed, the sinogram filtering is done using the iterative method described above. For each transverse location (r,$\Theta$) in the stack of sinograms there is an axial column of length N (number of slices). The sinogram values in this axial column are selected as the elements of the vector q, and the iterative method to estimate p' is initialized by setting $p^{(0)}$=q. After K iterations (typically from 2 to 5), the vector $p^{(k)}$ is stored in the axial column for this (r,$\Theta$), and the process is repeated for the next (r,$\Theta$) column in the stack of sinograms.

In the case of image filtering, we generate $h^i(x,y,z,z')$ for 33 values of z' spaced 2 mm apart (i.e. the slice thickness) from z'=0 (central transverse slice of scanner) to z'=64 mm (slice at end of axial field of view). For each value of z' we generate $h^i(x,y,z,z')$ for 49 samples of x and y on a $7 \times 7$ grid with a spacing of 20 mm, so that the grid extends from 0 to 120 mm in the x and y directions. The sample spacing in the x and y directions is larger than that in the z' direction, because the rate of variation of the function $h^i$ is much greater in the z' direction than in the x and y directions. The number of samples of z depends on the acceptance angle and on the position (x, y, z'). The values of the spread function for each position are generated by multi-slice rebinning of simulated data, as follows.

A simulated point source is placed at (x,y,z') and lines through the point source are simulated. The lines are uniformly distributed in the angular range specified by the acceptance angle (e.g. ±6.5 degrees around the plane z=z') and in the angular range 0 to 180 degrees for the projection of the line onto the transverse plane. Each simulated line that intersects a pair of detectors is rebinned, and the accumulated total for each slice in sinogram space is stored as the spread function for this (x,y,z'). The simulated point is then moved to the next grid point, and the multi-slice rebinning process is repeated to generate the next spread function. We presently simulate lines for $192 \times 256$ angles (transverse x axial) for each of the $7 \times 7 \times 33 = 1617$ positions of the point source. These positions at which the spread function is computed are distributed over the image-space octant for which $x \geq 0$, $y \geq 0$, $z \geq 0$. When the blurring function $h^i$ is needed for some arbitrary (x,y,z), the precomputed spread function at the position nearest to $(|x|,|y|,|z|)$ is used.

Figure 8:
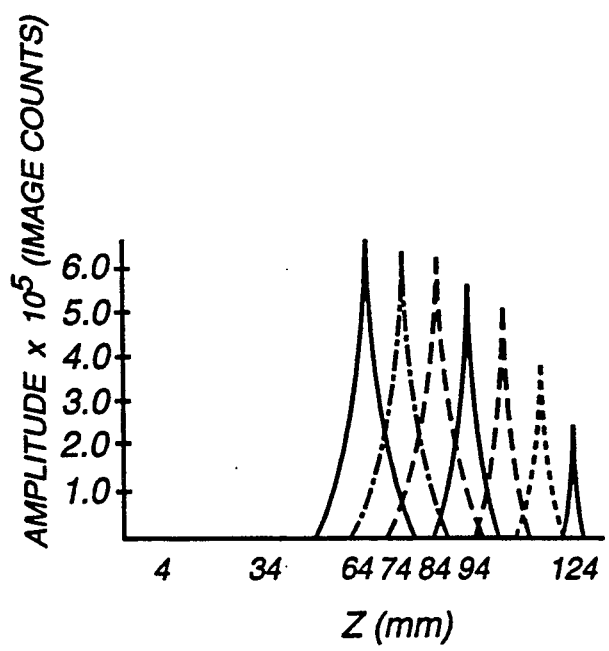
FIG. 8 graphically depicts spread functions in the axial (z) direction, derived in accordance with the invention.

Examples of the point-spread function $h^i$ are shown in FIG. 8 for points on the z' axis. FIG. 8 shows clearly the decreasing height and width of the axial spread function, due to the decreasing axial acceptance angle, as the simulated point source is moved along the z' axis. The filtering process adjusts the data for the relative height of the $h^i$ functions, so the standard axial normalization is performed automatically, together with the axial deblurring. As has been explained, it has been found that the spread function is nearly constant in the transverse direction, but changes rapidly in the z direction.

The above-described method of image filtering is applied independently to each axial column of the image volume, in a manner similar to the implementation of sinogram filtering that is described above. Image filtering as described above may be viewed as more general than sinogram filtering, since sinogram filtering is based on the assumption that the spread function for a point source at (x',y',z') is independent of x' and y'. On the other hand, this assumption means that only a few different spread functions are needed for sinogram filtering, so relatively little computation is required to produce the table of spread functions. Once the tables of spread functions have been produced for the respective methods, implementation of sinogram filtering takes approximately four times as long as image filtering because of the relative sizes of the arrays involved. With the above geometry, the sinogram array for each slice is 192 angles×256 rays, whereas the reconstructed image for each slice is a circular region of diameter 128 pixels. An image filtering operation of 5 iterations on a volume image of 63 slices takes less than 3 minutes with a non-optimized program on a Sun Microsystems SparcStation 330 (using a precomputed table of spread functions).

Figure 9:
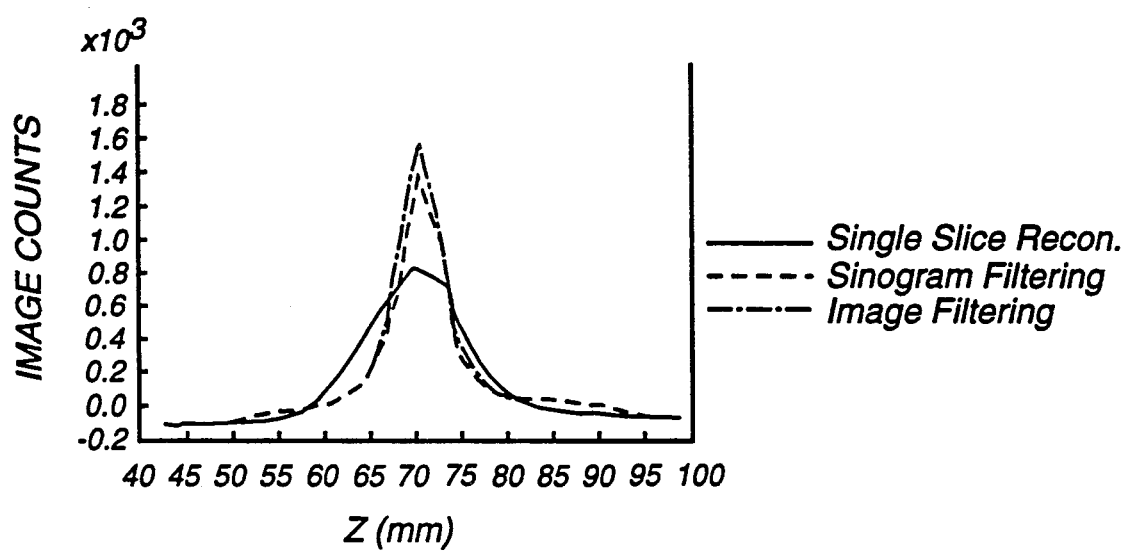
FIG. 9 graphically depicts data for the axial (z) profile through a point source, using the present invention and other image reconstruction techniques.

FIG. 9 shows profiles through a point source using single-slice reconstruction showing a low amplitude but wide profile and the same data reconstructed using both sinogram and image axial filtering. The latter two profiles show higher amplitude and a narrower profile demonstrating the improved performance achieved with multi-slice rebinning followed by axial filtering.

Applicants believe that it is well within the ordinary skill in the art to implement the present method using conventional data processing programs and apparatus.

The present invention may be embodied in other specific steps or forms without departing from its spirit or essential attributes. Accordingly, reference should be made to the appended claims, rather than the foregoing specification, as indicating the scope of the invention.

We claim:

1. A computer implemented method for reconstructing images, comprising the steps of:
   providing an array of detectors, the detectors being disposed around and having therebetween a transversely and axially extending field of view, the detectors having an axial acceptance angle such as to enable sensing of both transverse and oblique rays;
   detecting in said field of view both transverse and oblique rays;
   converting the detected rays to data in electrical form;
   collecting and assembling said data representative of the detected rays;
   rebinning said data to create a stack of two-dimensional data sets representative of individual transverse slice images, whereby said slice images signify in the aggregate a three-dimensional image;
   reconstructing slice-by-slice from said data sets a three-dimensional image; and
   axially filtering said rebinned data to reduce blurring resulting from said rebinning.

2. A computer implemented method in accordance with claim 1, wherein said data sets are representative of sinograms.

3. A computer implemented method in accordance with claim 1, wherein said step of axial filtering is performed on said data sets before said step of reconstructing the three-dimensional image.

4. A computer implemented method in accordance with claim 1, wherein said step of axial filtering is performed on the three-dimensional image after said step of reconstructing the three-dimensional image.

5. A computer implemented method for reconstructing images using a device of the type having an array of detectors, the detectors having therebetween a transversely and axially extending field of view and having an axial acceptance angle such as to enable sensing of both transverse and oblique rays, comprising the steps of:
   detecting in said field of view both transverse and oblique rays;
   converting the detected rays to data in electrical form;
   collecting and assembling said data representative of the detected rays;
   rebinning said data to create a stack of two-dimensional data sets representative of individual transverse slice images, whereby said slice images signify in the aggregate a three-dimensional image;
   reconstructing slice-by-slice from said data sets a three-dimensional image; and
   axially filtering said rebinned data to reduce blurring resulting from said rebinning;
   said step of rebinning said data comprising the further steps of:
   for each oblique ray, identifying among said transverse data sets the images intersected by said ray; and
   applying to each of the data sets associated with the images intersected by said ray an increment representative of said ray.

6. A computer implemented method in accordance with claim 5, wherein the data sets are sinograms, said step of applying an increment to each of the data sets for a given line comprising applying the increment to each of the sinograms at the same two-dimensional location thereon.

7. A computer implemented method for reconstructing images using a device of the type having an array of detectors, the detectors having therebetween a transversely and axially extending field of view and having an axial acceptance angle such as to enable sensing of both transverse and oblique rays, comprising the steps of:
   detecting in said field of view both transverse and oblique rays;
   converting the detected rays to data in electrical form;
   collecting and assembling said data representative of the detected rays;
   rebinning said data to create a stack of two-dimensional data sets representative of individual transverse slice images, whereby said slice images signify in the aggregate a three-dimensional image;
   reconstructing slice-by-slice from said data sets a three-dimensional image; and
   axially filtering said rebinned data to reduce blurring resulting from said rebinning, said step of axial filtering being performed on the three-dimensional image after said step of reconstructing the three-dimensional image and comprising the further steps of:
   selecting a plurality of axially spaced locals $z'$ along the longitudinal axis of the field of view, the spacing of the locales corresponding to the thickness of said slice images;
   establishing at each locale $z'$ a grid defining a plurality of positions $(x, y, z')$ in the transverse plane through the locale $z'$;

simulating for each position a point source and rays through said point source;

rebinning and storing data representative of said simulated rays, whereby said rebinned and stored data provides a spread function relating to said simulated point source; and applying said spread functions to the data representative of said three-dimensional image in order to reduce the axial blurring present in said three-dimensional image.

8. A computer implemented method in accordance with claim 7, wherein the axial field of view has a central transverse plane and the selected locales z' are disposed from the central transverse plane of the axial field of view to the end of the field of view, the longitudinal axis of the field of view being disposed at a central location within the grid and the grid having a transverse (x,y) dimension approximately equal to the transverse dimension of the field of view.

9. A computer implemented method for reconstructing images using a device of the type having an array of detectors, the detectors having therebetween a transversely and axially extending field of view and having an axial acceptance angle such as to enable sensing of both transverse and oblique rays, comprising the steps of:

detecting in said field of view both transverse and oblique rays;

converting the detected rays to data in electrical form;

collecting and assembling said data representative of the detected rays;

rebinning said data to create a stack of two-dimensional data sets representative of individual transverse slice images, whereby said slice images signify in the aggregate a three-dimensional image;

reconstructing slice-by-slice from said data sets a three-dimensional image; and axially filtering said rebinned data to reduce blurring resulting from said rebinning, said step of axial filtering being performed on said data sets before said step of reconstructing the three-dimensional image and comprising the further steps of:

selecting a plurality of axially spaced locales z' along the longitudinal axis of the field of view, the spacing of the locales corresponding to the thickness of said slice images;

simulating at each locale z' a point source and rays through said point source, said simulated rays being uniformly distributed in the transverse plane through the locale z' and in oblique planes through the locale z within the range defined by the axial acceptance angle of the detectors;

selecting from among said simulated rays those which intersect a pair of detectors;

rebinning, accumulating and storing data representative of said selected rays, whereby said data provides a spread function relating to the locale z'; and applying said spread functions to the data representative of the respective sinograms in order to reduce the axial blurring present in said stack of two-dimensional data sets.

10. A computer implemented method in accordance with claim 9, wherein the axial field of view has a central transverse plane and the selected locales z' are disposed from the central transverse plane (z'=o) of the axial field of view to the end of the field of view.

11. A computer implemented method for reconstructing images in positron emission tomography using a device of the type having an array of detectors, the detectors having therebetween a transversely and axially extending field of view and having an axial acceptance angle such as to enable sensing of both transverse and oblique rays, comprising said steps of:

detecting in the field of view both transverse and oblique rays;

converting the detected rays to data in electrical form;

collecting and assembling said data representative of the detected rays;

rebinning said data to create a stack of two-dimensional sinograms representative of individual transverse slice images, whereby said slice images signify in the aggregate a three-dimensional image;

reconstructing slice-by-slice from said sinograms a three-dimensional image; and axially filtering said rebinned data to reduce blurring resulting from said rebinning.

12. A computer implemented method in accordance with claim 11, wherein said step of axial filtering is performed on said sinograms before said step of reconstructing the three-dimensional image.

13. A computer implemented method in accordance with claim 11, wherein said step of axial filtering is performed on the three-dimensional image after said step of reconstructing the three-dimensional image.

14. A computer implemented method for reconstructing images in positron emission tomography using a device of the type having an array of detectors, the detectors having therebetween a transversely and axially extending field of view and having an axial acceptance angle such as to enable sensing of both transverse and oblique rays, comprising the steps of;

detecting in said field of view both transverse and oblique rays;

converting the detected rays to data in electrical form;

collecting and assembling said data representative of the detected rays;

rebinning said data to create a stack of two-dimensional sinograms representative of individual transverse slice images, whereby slice images signify in the aggregate a three-dimensional image;

reconstructing slice-by-slice from said sinograms a three-dimensional image; and axially filtering said rebinned data to reduce blurring resulting from said rebinning, said step of axially filtering said rebinned data comprising the further steps of:

selecting a plurality of axially spaced locales z' along the longitudinal axis of the field of view, the spacing of the locales corresponding to the thickness of said slice images;

establishing at each locale z' a grid defining a plurality of positions (x, y, z') in the transverse plane through the locale z';

simulating for each position a point source and rays through said point source;

rebinning and storing data representative of said simulated rays, whereby said rebinned and stored data provides a spread function relating to said simulated point source; and applying said spread functions to the data representative of said three-dimensional image in order to reduce the axial blurring present in said three-dimensional image.

15. A computer implemented method in accordance with claim 14, wherein the axial field of view has a central transverse plane and the selected locales z' are disposed from the central transverse plane of the axial field of view to the end of the field of view, the longitudinal axis of the field of view being disposed at a central location within the grid and the grid having a transverse (x,y) dimension approximately equal to the transverse dimension of the field of view.

16. A computer implemented method for reconstructing images in positron emission tomography using a device of the type having an array of detectors, the detectors having therebetween a transversely and axially extending field of view and having an axial acceptance angle such as to enable sensing of both transverse and oblique rays, comprising the steps of:

detecting in said field of view both transverse and oblique rays;

converting the detected rays to data in electrical form;

collecting and assembling said data representative of the detected rays;

rebinning said data to create a stack of two-dimensional sinograms representative of individual transverse slice images, whereby said slice images signify in the aggregate a dimensional image;

reconstructing slice-by-slice form said sinograms a three-dimensional image; and axially filtering said rebinned data to reduce blurring resulting from said rebinning, said step of axially filtering said rebinned data comprising the further steps of;

selecting a plurality of axially spaced locales z' along the longitudinal axis of the field of view, the spacing of the locales corresponding to the thickness of said slice images;

simulating at each locale z' a point source and rays through said point source, said simulated rays being uniformly distributed in the transverse plane through the locale z' and in oblique planes through the locale z' within the range defined by the axial acceptance angle of the detectors;

selecting from among said simulated rays those which intersect a pair of detectors;

rebinning, accumulating said storing data representative of said selected rays, whereby said data provides a spread function relating to the locale z'; and applying said spread functions to the data representative of the respective sinograms in order to reduce the axial blurring present in said stack of sinograms.

17. A computer implemented method in accordance with claim 16, wherein the axial field of view has a central transverse plane and the selected locales z' are disposed form the central transverse plane (z'=o) of the axial field of view to the end of the field of view.

* * * * *